(12) United States Patent
Spangler

(10) Patent No.: US 11,454,124 B2
(45) Date of Patent: Sep. 27, 2022

(54) AIRFOIL TURN CHANNEL WITH SPLIT AND FLOW-THROUGH

(71) Applicant: United Technologies Corporation, Farmington, CT (US)

(72) Inventor: Brandon W. Spangler, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 142 days.

(21) Appl. No.: 16/686,696

(22) Filed: Nov. 18, 2019

(65) Prior Publication Data

US 2021/0148237 A1 May 20, 2021

(51) Int. Cl.
*F01D 5/18* (2006.01)
*F02C 7/12* (2006.01)

(52) U.S. Cl.
CPC .............. *F01D 5/187* (2013.01); *F02C 7/12* (2013.01); *F05D 2220/32* (2013.01); *F05D 2260/221* (2013.01)

(58) Field of Classification Search
CPC .......... F05D 2260/221; F05D 2220/32; F05D 2250/185; F02C 7/12; F01D 9/041; F01D 25/12; F01D 5/188; F01D 5/189; F01D 5/187

See application file for complete search history.

(56) References Cited

U.S. PATENT DOCUMENTS

| | | | |
|---|---|---|---|
| 5,120,192 A * | 6/1992 | Ohtomo | F01D 5/189 415/115 |
| 5,624,231 A * | 4/1997 | Ohtomo | F01D 5/186 415/115 |
| 8,628,294 B1 | 1/2014 | Liang | |
| 9,518,468 B2 * | 12/2016 | Tibbott | F01D 9/06 |
| 10,012,092 B2 | 7/2018 | Mongillo et al. | |
| 10,184,341 B2 | 1/2019 | Spangler | |
| 10,240,470 B2 | 3/2019 | Hagan et al. | |

(Continued)

FOREIGN PATENT DOCUMENTS

| EP | 3783197 | 2/2021 |
|---|---|---|
| WO | 2017105379 | 6/2017 |

OTHER PUBLICATIONS

European Search Report for European Patent Application No. 20207026.4 completed Mar. 9, 2021.

*Primary Examiner* — Justin D Seabe
*Assistant Examiner* — Andrew Thanh Bui
(74) *Attorney, Agent, or Firm* — Carlson, Gaskey & Olds, P.C.

(57) ABSTRACT

An airfoil includes an airfoil wall that defines a leading end, a trailing end, a first side, and a second side. Radially-extending ribs partition the interior cavity of the airfoil into first and second cooling channels and a radial cooling passage that is situated between the first and second cooling channels. The cooling channels extend to respective first and second channel ends. A turn channel connects the first and second channel ends. The turn channel splits at the first channel end into first and second channel legs such that there is a region between the first and second channel legs. The channels legs merge at the second channel end. The radial cooling passage extends through the region between the first and second channel legs.

15 Claims, 4 Drawing Sheets

(56) References Cited

U.S. PATENT DOCUMENTS

| | | |
|---|---|---|
| 10,259,039 B2 | 4/2019 | Slavens et al. |
| 10,267,163 B2 | 4/2019 | Spangler et al. |
| 10,428,686 B2 * | 10/2019 | Marsh .................... F01D 25/12 |
| 10,494,931 B2 | 10/2019 | Landrum et al. |
| 10,577,944 B2 * | 3/2020 | Clark ...................... F01D 5/186 |
| 2017/0101893 A1 * | 4/2017 | Marsh ...................... F01D 5/18 |
| 2017/0211416 A1 | 7/2017 | Weaver et al. |
| 2018/0306036 A1 | 10/2018 | Spangler et al. |
| 2021/0054747 A1 * | 2/2021 | Spangler ................ F01D 5/148 |

\* cited by examiner

AIRFOIL TURN CHANNEL WITH SPLIT AND FLOW-THROUGH

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil wall that defines a leading end, a trailing end, a first side, and a second side. The airfoil wall circumscribes an interior cavity. Radially-extending ribs partition the interior cavity into first and second cooling channels and a radial cooling passage is situated between the first and second cooling channels. The first and second cooling channels extend to respective first and second channel ends. A turn channel connects the first and second channel ends. The turn channel splits at the first channel end into first and second channel legs such that there is a region between the first and second channel legs. The first and second channel legs merge at the second channel end. The radial cooling passage extends through the region between the first and second channel legs.

In a further embodiment of any of the foregoing embodiments, the radial cooling passage is flow isolated from the first and second cooling channels.

In a further embodiment of any of the foregoing embodiments, the radial cooling passage narrows to a neck portion, and the neck portion extends through the region between the first and second channel legs.

In a further embodiment of any of the foregoing embodiments, the turn channel includes a middle section between first and second ears. The middle section splits into the first and second channel legs.

In a further embodiment of any of the foregoing embodiments, from the channel end of the first cooling channel, the first and second legs increase in thickness and decrease in width.

In a further embodiment of any of the foregoing embodiments, the first and second channel legs increase in thickness by diffusion angles of no greater than 15 degrees.

An airfoil according to an example of the present disclosure includes an airfoil wall that defines a leading end, a trailing end, a first side, and a second side. First, second, and third ribs each connect the first and second sides of the airfoil wall. Each of the first, second, and third ribs define a tube portion that circumscribes a rib passage. First and second connector arms solely join the tube portion to, respectively, the first and second sides of the airfoil wall. The first rib, the second rib, and the airfoil wall bound a first cooling channel there between. The first cooling channel has a first cooling channel radial end. The second rib, the third rib, and the airfoil wall bound a second cooling channel there between. The second cooling channel has a second cooling channel radial end, and a turn channel fluidly connects the first cooling channel radial end and the second cooling channel radial end.

In a further embodiment of any of the foregoing embodiments, at the first cooling channel radial end the turn channel splits into first and second channel legs such that there is a region between the first and second channel legs. The first and second channels legs merge at the second cooling channel radial end.

In a further embodiment of any of the foregoing embodiments, the rib passage extends through the region between the first and second channel legs.

In a further embodiment of any of the foregoing embodiments, the turn channel includes a middle section between first and second ear sections, and the middle section splits into the first and second legs.

In a further embodiment of any of the foregoing embodiments, each of the first and second channel legs has a mouth at the first cooling channel radial end and a crest at an apex of the turn channel. The mouth defines a cross-sectional area. The crest defines a cross-sectional area, and the cross-sectional area of the crest is from 25% to 150% of the cross-sectional area of the mouth.

In a further embodiment of any of the foregoing embodiments, the first and second channel legs have an inner turn radius that is greater than a thickness dimension of the cross-sectional area of the mouth by a factor of at least 2. The inner turn radius is taken from a line at an intersection of planes associated with the cross-sectional area of the mouth and the cross-sectional area of the crest.

In a further embodiment of any of the foregoing embodiments, the first and second legs have diffusion angles of no greater than 15 degrees.

In a further embodiment of any of the foregoing embodiments, the rib passage is flow isolated from the first and second cooling channels.

A gas turbine engine according to an example of the present disclosure includes a compressor section, a combustor in fluid communication with the compressor section, and a turbine section in fluid communication with the combustor. The turbine section has an airfoil that includes an airfoil wall that defines a leading end, a trailing end, a first side, and a second side. The airfoil wall circumscribes an interior cavity. Radially-extending ribs partition the interior cavity into first and second cooling channels and a radial cooling passage is situated between the first and second cooling channels. The first and second cooling channels extend to respective first and second channel ends, and a turn channel connects the first and second channel ends. The turn channel splits at the first channel end into first and second channel legs such that there is a region between the first and second channel legs. The first and second channels legs merge at the second channel end. The radial cooling passage extends through the region between the first and second channel legs In a further embodiment of any of the foregoing embodiments, the turn channel includes a middle section between first and second ear sections, and the middle section splits into the first and second legs.

In a further embodiment of any of the foregoing embodiments, each of the first and second legs has a mouth at the first channel end and a crest at an apex of the turn channel.

The mouth defines a cross-sectional area. The crest defines a cross-sectional area, and the cross-sectional area of the crest is from 25% to 150% of the cross-sectional area of the mouth.

In a further embodiment of any of the foregoing embodiments, the first and second legs have an inner turn radius that is greater than a thickness dimension of the cross-sectional area of the mouth by a factor of at least 2. The inner turn radius is taken from an intersection of planes of the cross-sectional area of the mouth and the cross-sectional area of the crest.

In a further embodiment of any of the foregoing embodiments, the first and second legs increase in thickness from the first channel end with diffusion angles of no greater than 15 degrees.

In a further embodiment of any of the foregoing embodiments, the radial cooling passage is flow isolated from the first and second cooling channels.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
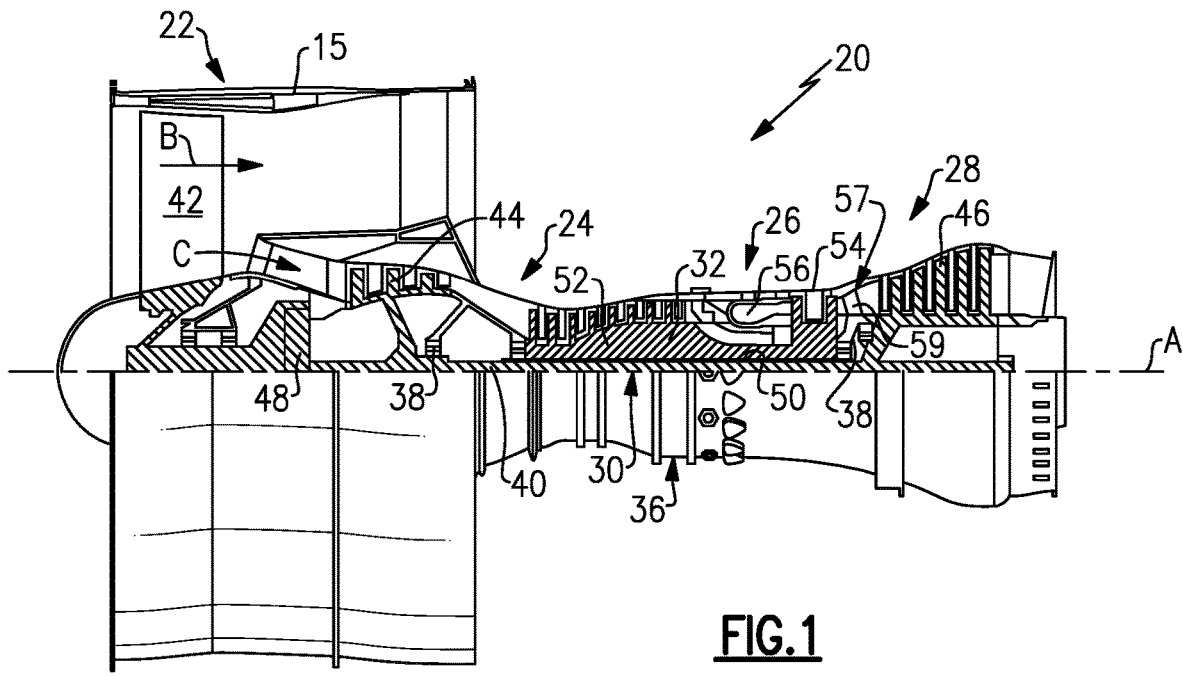
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
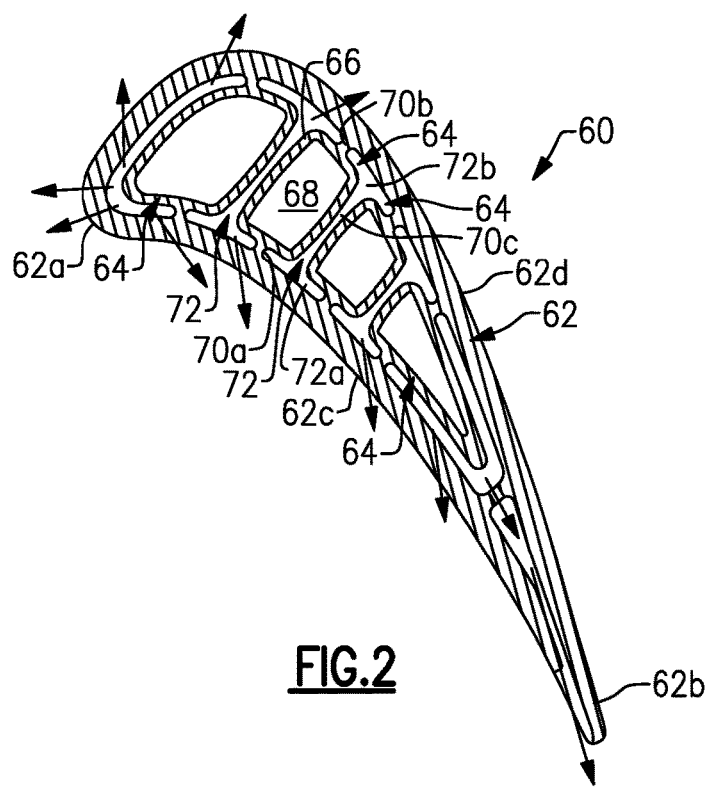
FIG. 2 illustrates a sectioned view of an airfoil.

FIG. 2 illustrates a sectioned airfoil 60 used in the turbine engine 20 (see also FIG. 1). The airfoil 60 is a turbine blade; however, it is to be understood that this disclosure is also applicable to cooled blades or vanes The airfoil 60 includes an (outer) airfoil wall 62 that delimits the aerodynamic profile of the airfoil 60. In this regard, the wall 62 defines a leading end 62a, a trailing end 62b, and first and second sides 62c/62d that join the leading end 62a and the trailing end 62b. In this example, the first side 62c is a pressure side and the second side 62d is a suction side. For a blade, the airfoil wall 62 will typically span in a radial direction from an inner platform to a free tip end. In a vane, the airfoil wall 62 will typically span in a radial direction from an inner platform to an outer platform.

The airfoil 60 further includes ribs 64 that each connect the first and second sides 62c/62d of the airfoil wall 62. In the illustrated example, the airfoil has four such ribs 64, although the airfoil 60 in modified examples can include fewer or additional ribs 64. And although a single rib 64 is described in some instances herein, it is to be understood that each such rib 64 has the described attributes of the single rib 64.

The ribs 64 are generally radially elongated between an inner diameter and outer diameter to span the full or substantially full longitudinal distance of the airfoil wall 62. The term substantially full refers to at least 70% of the longitudinal distance between the inner diameter and outer diameter.

Each rib 64 defines a tube portion 66 that circumscribes a rib passage 68, and first and second connector arms 70a/70b that solely join the tube portion 66 to, respectively, the first and second sides 62c/62d of the airfoil wall 62. As used herein, the phrase "solely join" or variations thereof refers to the arm 70a being the exclusive structural attachment of the tube portion 66 to the first side 62c and the arm 70b being the exclusive structural attachment of the tube portion 66 to the second side 62d. Such an attachment configuration permits the rib 64 to reinforce the sides 62c/62d to facilitate reduction in bulging from internal pressure, while still permitting the rib 64 to move and thermally expand and contract at a different rate than the sides 62c/62d during thermal cycling.

The ribs 64 partition the interior cavity of the airfoil 60 such that the airfoil wall 62 and the rib 64 bound cooling channels 72 there between. In the illustrated example, a forward one of the cooling channels 72 may be considered a first cooling channel and the next aft cooling channel 72 may be considered a second cooling channel. The terminology "first" and "second" is to differentiate that there are two distinct cooling channels. It is to be understood that the terms "first" and "second" are interchangeable and that the first cooling channel could alternatively be termed as the second cooling channel and that the second cooling channel could alternatively be termed as the first cooling channel, provided the cooling channels are consecutive (a single tube portion 66 in between). If the airfoil 60 includes additional cooling channels 72, any two consecutive cooling channels are considered first and second cooling channels.

Due to the geometry of the tube portions 66 and the connector arms 70a/70b, the cooling channels 72 in the illustrated example have an I-shape. In the I-shape, a bottom leg 72a of the "I" extends along the first side 62c, a top leg 70b of the "I" extends along the second side 62d, and the middle leg 72c of the "I" extends between a forward side of one tube portion 66 and an aft side of another tube portion 66. The top and bottom legs 72a/72b of the "I" are bound by the pressure/suction sides of the tube portions and the first and second sides 62c/62d of the airfoil wall 62.

Cooling air, such as bleed air from the compressor section 24 of the engine 20, can be provided to the cooling channels 72 and the rib passage 68. The cooling air can be fed from a radially inner or radially outer location into the cooling channels 72 and rib passage 68. For example, the tube portions 66 are continuous such that the cooling channels 72 are flow isolated from the rib passages 68. As used herein, the phrase "flow isolated" or variations thereof refers to the cooling channels 72 not being fluidly connected to the rib passages 68 such that cooling air cannot flow there between. For instance, such flow isolation permits air in the cooling channels 72 and the rib passages 68 to be used at differential pressures. In this regard, cooling air in the cooling channels 72 can be discharged through cooling holes or the like in the side walls 62c/62d to serve for cooling the side walls 62c/62d, while cooling air in the rib passage 68 can serve to cool a blade tip or platform or be provided to other downstream structures.

Figure 3:
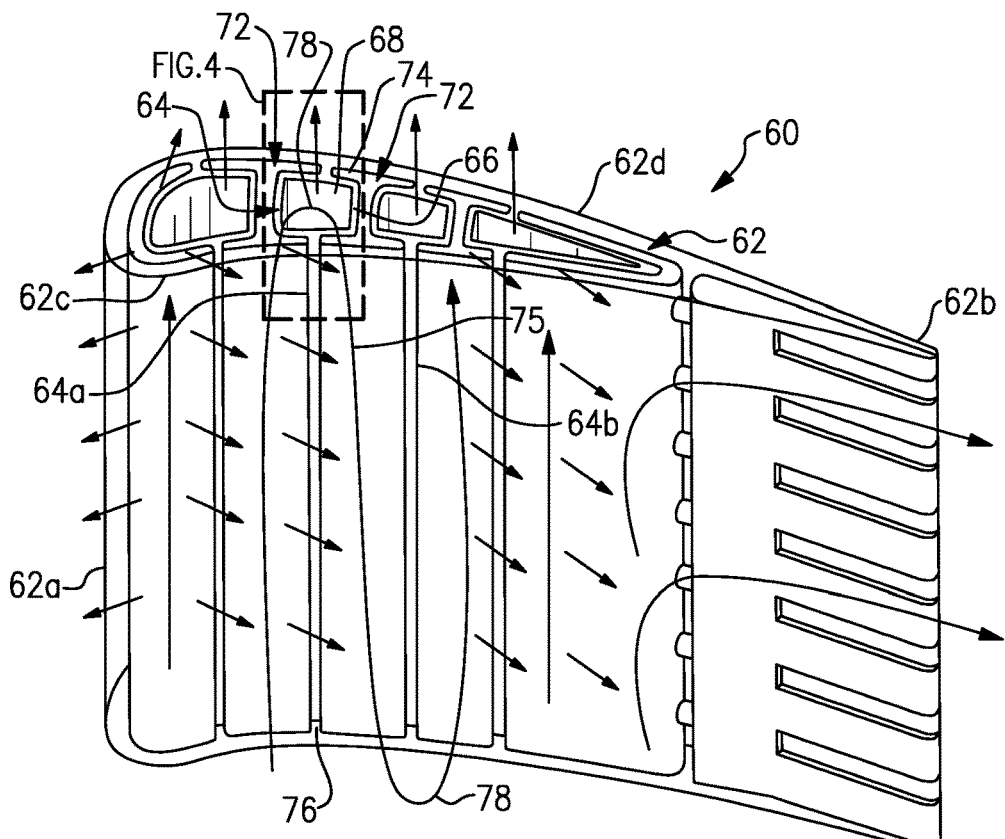
FIG. 3 illustrates a view of the airfoil and serpentine flow configuration.

Referring to FIG. 3, the radial extents of the cooling channels 72 are shown. Each cooling channel 72 extends between first and second cooling channel radial ends 74/76 (hereafter "ends"). For instance, in this example, the end 74 is a radially outer end and the end 76 is a radially inner end. The examples herein, however, are applicable to the radially inner end, the radially outer end, or both.

The cooling channels 72 are connected in a serpentine flow pattern, indicated at cooling path circuit 75. In this regard, the airfoil 60 includes turn channels 78 at the ends 74/76. In FIG. 3 the turn channels 78 are only schematically shown. The turn channels 78 serve to transfer flow from the one cooling channel 72 to the next consecutive cooling channel 72 (or alternatively any two adjacent cooling channels 72).

Traditional turn channels in serpentine configurations are typically designed for simple channel geometries to turn flow from one channel to the immediately neighboring channel. Such turns, however, are inapplicable to more complex channel geometries and channel configurations and do not permit advanced cooling flow configurations. In this regard, as will be described below, the turn channel 78 according to the present disclosure facilitates turning between complex channels that are not directly next to each other.

Figure 4:
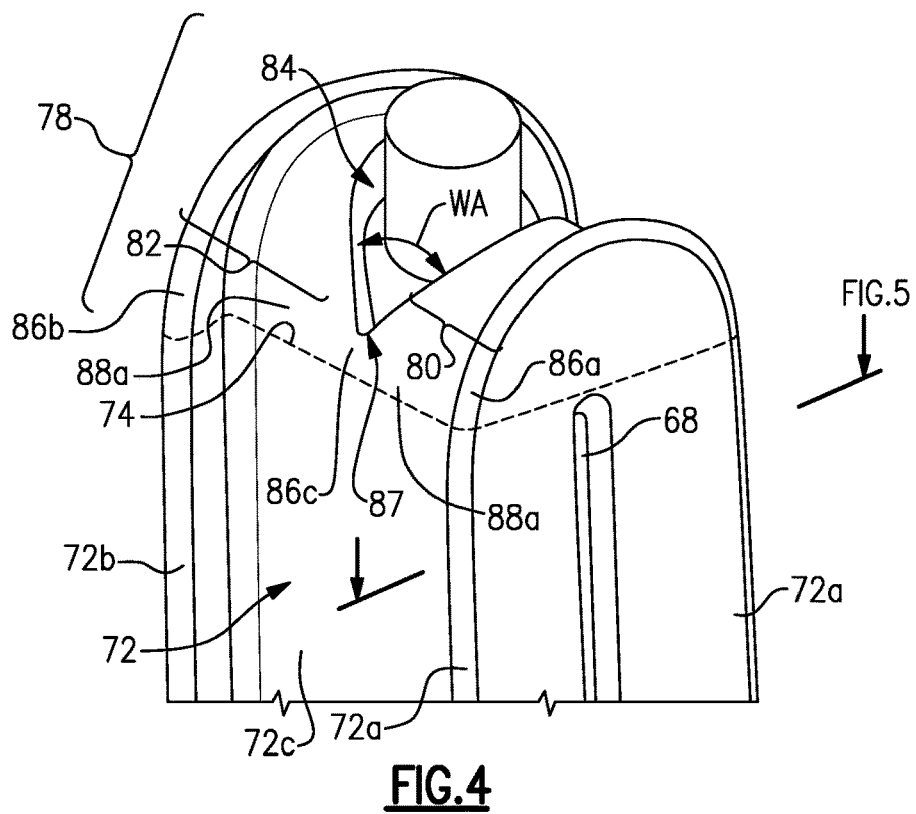
FIG. 4 illustrates a view of a turn channel.

FIG. 4 shows a representation of the region identified in FIG. 3. As channels and features inside of a solid object are difficult to view, the turn channel 78 in FIG. 4 is shown in a negative view, where solid and open regions in the actual turn channel 78 are shown in the inverse relation in the figure, i.e., solid in the figure is open in the actual and open in the figure is solid in the actual. FIGS. 4, 5, 6, 7, and 8A are negative representations.

Figure 5:
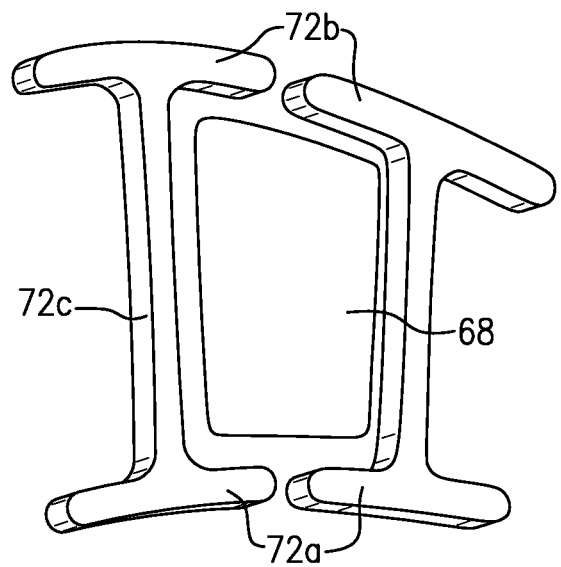
FIG. 5 illustrates a sectioned view of the turn channel.
Figure 6:
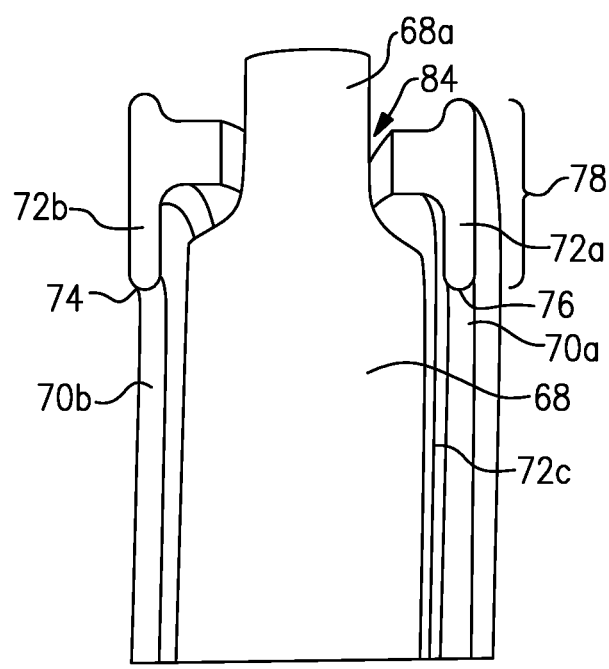
FIG. 6 illustrates another sectioned view of the turn channel.
Figure 7:
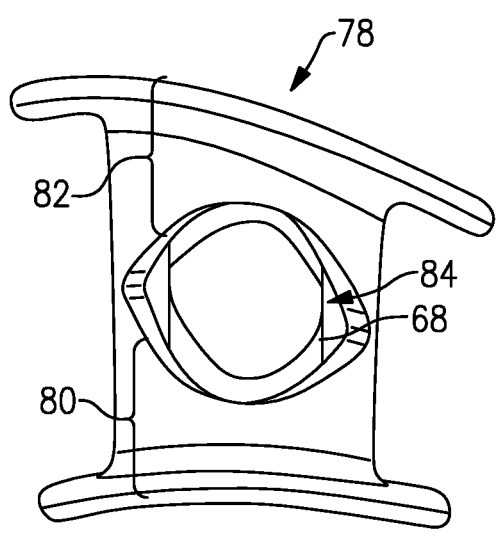
FIG. 7 illustrates a radial view of the turn channel.

Referring also to FIGS. 5, 6, and 7, the turn channel 78 splits at the end 74 of the first cooling channel 72 into first and second channel legs 80/82 such that there is a region 84 between the first and second channel legs 80/82. On the other side of the region 84, the first and second channel legs 80/82 merge at the end 74 of the receiving cooling channel 72. A radial cooling passage, here the rib passage 68, extends through the region 84 between the first and second channel legs 80/82. As best viewed in FIG. 6, the rib passage 68 narrows to a neck portion 68a, and the neck portion 68a extends through the region 84. The relatively narrow neck portion 68a permits lower angle splits. The split and region 84 thereby enable a pass-through configuration in which the rib passage 68 can continue to extend radially, yet still permit turning of the cooling air in the cooling channels 72.

In the illustrated example, the turn channel 78 includes several sections to receive the cooling air flow from the different legs of the cooling channels 72. The turn channel 78 includes first and second ears 86a/86b and a middle section 86c that connects the ears 86a/86b. The middle section 86c receives cooling air flow from the middle leg 72c of the cooling channel 72, and the ears 86a/86b receive cooling air flow from, respectively, the legs 72a/72b of the channel 72. In this example, it is the middle section 86c of the turn channel 78 that splits into the first and second channel legs 80/82 at wedge portion 87. The wedge portion 87 defines a wedge half-angle WA between the split sides of the cooling channel legs 80/82. For example, the wedge half-angle WA is from 15 degrees to 45 degrees. In one example, the sides of the cooling channel legs 80/82 are straight, however, in other examples the sides have a beta-spline shape, in which case, the half-angle is taken from the tangent lines.

Figure 8A:
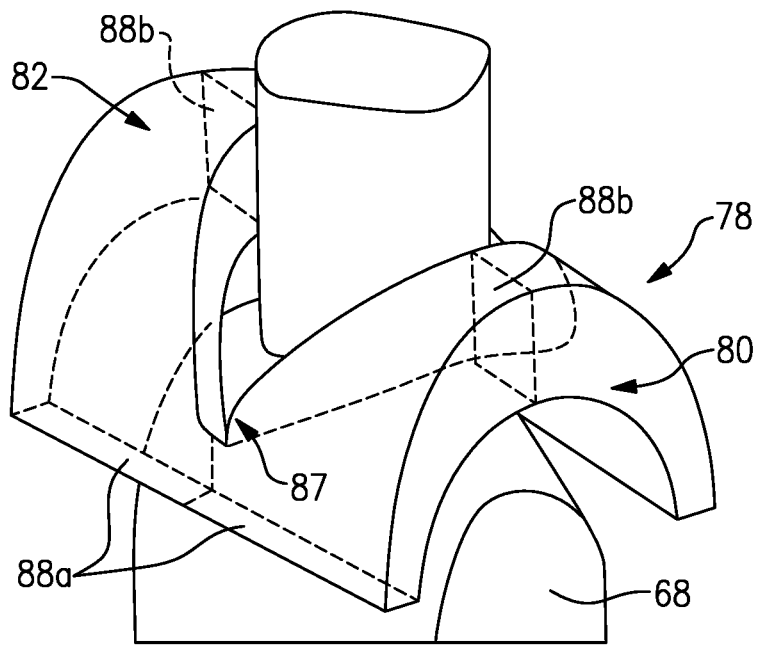
FIG. 8A illustrates a view of a portion of the turn channel.
Figure 8B:
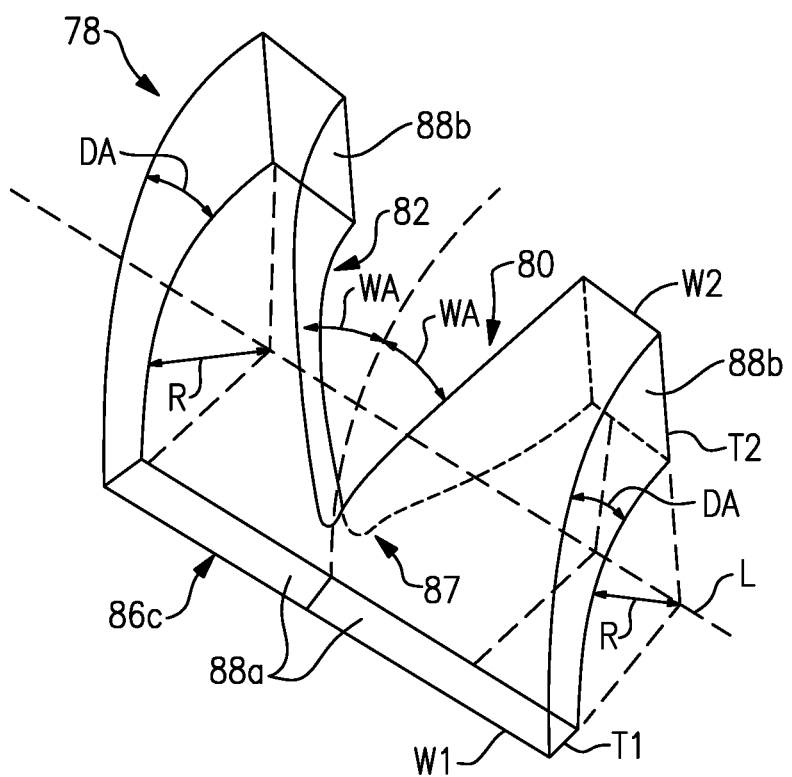
FIG. 8B illustrates a wireframe view of a portion of the turn channel.

The turn channel 78 is designed to facilitate smooth turning flow of the cooling air from one cooling channel 72 to the next. In further examples, the turn channel 78 has the features described below with reference also to FIGS. 8A and 8B (the ears 86a/86b are excluded in these views). Each of the first and second channel legs 80/82 has a mouth 88a at the end 74 of the cooling channel 72 (FIG. 4) and a crest 88b at an apex of the turn channel 78. The mouth 88a defines a cross-sectional area of W1×T1 (width×thickness), the crest defines a cross-sectional area of W2×T2 (width×thickness), and the cross-sectional area of the crest 88b is from 25% to 150% of the cross-sectional area of the mouth 88a. Additionally, W2 is from 25% to 75% of W1, and T2 is from 100% to 300% of T1. In one further example, from the channel end 74 at the mouth 88a, the channel legs 80/82 increase in thickness and decrease in width up to the crest 88b.

The mouth 88a and crest 88b represent planes, which if extended intersect and a line L. The first and second channel legs 80/82 have an inner turn radius R taken with regard to the line L. The inner turn radius R is greater than the radial thickness T1 of the cross-sectional area of the mouth 88a by a factor of at least 2 and up to 7. Additionally, the first and second channel legs 80/82 have diffusion angles DA taken between radially inner and outer surfaces of each channel leg 80 or 82. The diffusion angle is not greater than 15 degrees. The attributes above facilitate smooth transition into the turn channel 78 and smooth turning of the flow, to reduce flow detachment and avoid pressure loss therefrom.

Additionally, the design of the turn channel 78 facilitates maintaining the cooling air flow in the same legs of the cooling channels 72 through the turn. For instance, the ears 86a/86b are radially thicker than the channel legs 80/82. Flow in the ears 86a/86b thus would have to turn to flow out of the ears 86a/86b into the channel legs 80/82. As a result, the ears 86a/86b contain the flow therein and serve as flow tracks for the cooling air flow from the legs 72a/72b of the cooling channel 72, to turn that flow into the corresponding legs 72a/72b of the receiving cooling channel 72 after the turn. Moreover, the cross-sectional areas of the mouth 88a and the crest 88b are substantially equal. As a result, although the flow in the middle section 88c splits into the channel legs 80/82, the flow is not substantially constricted or diffused. This permits the cooling air to continue flowing at substantially the same flow rate, thereby reducing rate increases or decreases that tend to disrupt flow and cause pressure loss. As will be appreciated, however, the examples according to this disclosure will also find use in other serpentine configurations that have other channel shapes. In that regard, the channel legs 80/82 will be configured to correspond to the cooling channel geometry. Accordingly, the pass-through design herein can be applied to any number of channel configurations.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil wall defining a leading end, a trailing end, a first side, and a second side, the airfoil wall circumscribing an interior cavity; and
radially-extending ribs that partition the interior cavity into first and second cooling channels and a radial cooling passage situated between the first and second cooling channels, the first and second cooling channels extending to respective first and second channel ends; and
a turn channel connecting the first and second channel ends, the turn channel splitting at the first channel end into first and second channel legs such that there is a region between the first and second channel legs, the first and second channels legs merging at the second channel end, the radial cooling passage narrowing to a neck portion, and the neck portion extending through the region between the first and second channel legs.

2. The airfoil as recited in claim 1, wherein the radial cooling passage is flow isolated from the first and second cooling channels.

3. The airfoil as recited in claim 1, wherein the turn channel includes a middle section between first and second ears, the middle section splitting into the first and second channel legs.

4. The airfoil as recited in claim 1, wherein, from the channel end of the first cooling channel, the first and second legs increase in thickness and decrease in width.

5. The airfoil as recited in claim 4, wherein the first and second channel legs increase in thickness by diffusion angles of no greater than 15 degrees.

6. A gas turbine engine comprising:
a compressor section;
a combustor in fluid communication with the compressor section; and
a turbine section in fluid communication with the combustor,
the turbine section having an airfoil that includes
an airfoil wall defining a leading end, a trailing end, a first side, and a second side, the airfoil wall circumscribing an interior cavity, radially-extending ribs that partition the interior cavity into first and second cooling channels and a radial cooling passage situated between the first and second cooling channels, the first and second cooling channels extending to respective first and second channel ends, and a turn channel connecting the first and second channel ends, the turn channel including a middle section between first and second ear sections, and the middle section splitting at the first channel end into first and second channel legs such that there is a region between the first and second channel legs, the first and second channels legs merging at the second channel end, the radial cooling passage extending through the region between the first and second channel legs.

7. The gas turbine engine as recited in claim 6, wherein each of the first and second legs has a mouth at the first channel end and a crest at an apex of the turn channel, the mouth defining a cross-sectional area, the crest defining a cross-sectional area, and the cross-sectional area of the crest is from 25% to 150% of the cross-sectional area of the mouth.

8. The gas turbine engine as recited in claim 7, wherein the first and second legs have an inner turn radius that is greater than a thickness dimension of the cross-sectional area of the mouth by a factor of at least 2, wherein the inner turn radius is taken from an intersection of planes of the cross-sectional area of the mouth and the cross-sectional area of the crest.

9. The gas turbine engine as recited in claim 6, wherein the first and second legs increase in thickness from the first channel end with diffusion angles of no greater than 15 degrees.

10. The gas turbine engine as recited in claim 6, wherein the radial cooling passage is flow isolated from the first and second cooling channels.

11. An airfoil comprising:
an airfoil wall defining a leading end, a trailing end, a first side, and a second side, the airfoil wall circumscribing an interior cavity; and radially-extending ribs that partition the interior cavity into first and second cooling channels and a radial cooling passage situated between the first and second cooling channels, the first and second cooling channels extending to respective first and second channel ends; and a turn channel connecting the first and second channel ends, the turn channel splitting at the first channel end into first and second channel legs such that there is a region between the first and second channel legs, the first and second channels legs merging at the second channel end, the radial cooling passage extending through the region between the first and second channel legs.

12. The airfoil as recited in claim 11, wherein the radial cooling passage is flow isolated from the first and second cooling channels.

13. The airfoil as recited in claim 12, wherein the turn channel includes a middle section between first and second ears, the middle section splitting into the first and second channel legs.

14. The airfoil as recited in claim 13, wherein, from the channel end of the first cooling channel, the first and second legs increase in thickness and decrease in width.

15. The airfoil as recited in claim 14, wherein the first and second channel legs increase in thickness by diffusion angles of no greater than 15 degrees.

* * * * *